United States Patent

Frenkel

[15] 3,638,497
[45] Feb. 1, 1972

[54] PRESSURE AND FORCE TRANSDUCER MEANS

[72] Inventor: Amotz Frenkel, Lansdale, Pa.
[73] Assignee: Transducer Systems, Inc., Willow Grove, Pa.
[22] Filed: July 16, 1969
[21] Appl. No.: 842,100

[52] U.S. Cl. ..............................73/398 R, 73/406, 73/407
[51] Int. Cl. ..........................................................G01l 9/10
[58] Field of Search.................73/398, 407, 141 A, 406; 317/261; 324/61; 336/30

[56] References Cited

UNITED STATES PATENTS

| | | | |
|---|---|---|---|
| 2,683,989 | 7/1954 | Clark | 336/30 X |
| 3,421,126 | 1/1969 | Ames, Jr. | 336/30 |
| 2,164,638 | 7/1939 | Broeze et al. | 73/398 UX |
| 2,367,866 | 1/1945 | Humphreys et al. | 73/398 |
| 3,106,095 | 10/1963 | Tavis | 73/398 X |

*Primary Examiner*—Donald O. Woodiel
*Attorney*—Jacob Trachtman

[57] ABSTRACT

A transducer means including a tubular housing having a resilient diaphragm mounted therein and extending thereacross adjacent one end of the housing. A mounting block is secure in the other end of the housing. A proximity transducer is mounted on the mounting block and extends into the housing. The proximity transducer has a core which projects from the end of the proximity transducer which is adjacent the diaphragm. A deflection core of metal is secured to the surface of the diaphragm which faces the core of the proximity transducer. A closure member is secured in the one end of the housing and includes means for applying to the diaphragm the pressure or force to be measured.

11 Claims, 4 Drawing Figures

INVENTOR
AMOTZ FRENKEL
BY Jacob Trachtman
ATTORNEY

PRESSURE AND FORCE TRANSDUCER MEANS

The present invention relates to a transducer means, and more particularly to a transducer means for converting a pressure or force to an electrical signal for measuring the pressure or force.

One method used for measuring the pressure of a medium, such as a liquid or gas, or a mechanically created force, is to convert the pressure or force to an electrical signal by means of a transducer. The transducer produces an electrical signal which varies in magnitude depending on the magnitude of the pressure or force applied to the transducer. To provide an accurate measurement of the pressure or force as it changes, the transducer must be capable of producing an electrical signal which varies precisely at the same rate as the pressure or force. A problem which affects the accuracy of such transducers is the hysteresis in the transducer. Hysteresis is a retardation of an effect when the forces acting upon a body are changed. Such hysteresis can result from improper stressing of a body or from friction caused by moving parts, such as mechanical linkages. Thus, hysteresis in a transducer can result in an inaccurate change in the electrical output signal when the pressure or force changes so that the output signal does not accurately indicate the pressure or force being measured.

It is an object of the present invention to provide a transducer means in which the hysteresis is negligible so as to provide an accurate measurement of the pressure or force being measured.

It is another object of the present invention to provide a transducer means minimizing such moving parts which can create undesirable hysteresis.

It is still another object of the present invention to provide a transducer means which is of a construction that is easy to make and can be made small in size.

These objects are achieved by a transducer which includes a tubular housing having a resilient metal diaphragm secured therein and extending thereacross. A proximity transducer is mounted in the housing with an end of the core thereof being adjacent the diaphragm. A deflection core of metal is secured to the surface of the diaphragm which faces the core of the proximity transducer. The housing is provided with means for applying the pressure or force to be measured to the diaphragm so as to flex the diaphragm an amount depending on the magnitude of the pressure or force. This moves the deflection core with respect to the core of the proximity transducer so to vary the output signal of the transducer and thereby provide an indication of the magnitude of the pressure or force.

For the purpose of illustrating the invention there is shown in the drawings forms which are presently preferred, it being understood, however, that this invention is not limited to the precise arrangements and instrumentalities shown.

Figure 1:
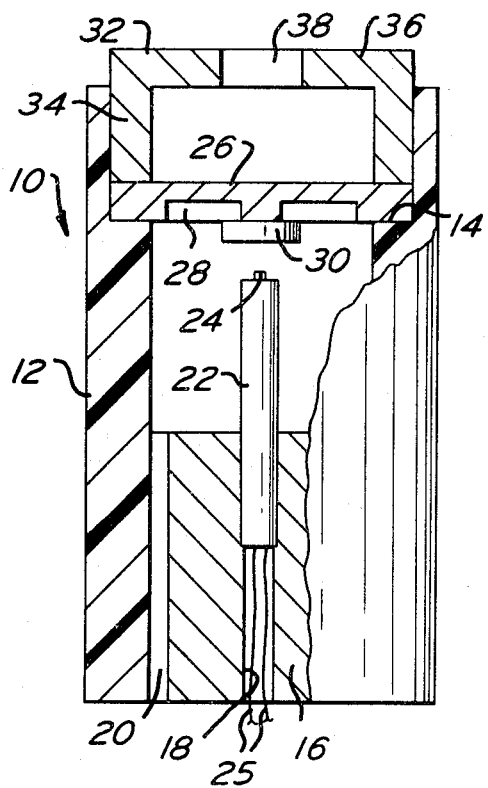
FIG. 1 is a longitudinal sectional view of a pressure transducer of the present invention.

Referring initially to FIG. 1, a pressure transducer of the present invention is generally designated as 10. Pressure transducer 10 comprises a cylindrical, tubular housing 12 of a nonmagnetic material such as a plastic or a nonmagnetic metal. One end of the housing 12 is counterbored to provide a radially extending ledge 14 which is spaced from the end of the housing. A transducer mounting block 16 is secured in the other end of the housing 12. The mounting block 16 has a mounting hole 18 extending longitudinally through the center thereof, and a vent hole 20 extending longitudinally therethrough adjacent its outer surface.

A proximity transducer 22 is mounted in the mounting hole 18 and projects beyond the mounting block 16 into the housing 12. The proximity transducer 22 is of any construction well known in the art. However, in general, such proximity transducers include a primary winding, a secondary winding and a core of magnetic material electrically coupling the windings so that an input current to the primary winding will induce an output current from the secondary winding. Such transducers are constructed so that when a metal member is moved into proximity to an end of the core, the voltage of the output current will change even though the input current is maintained constant. In the proximity transducer 22, the core 24 projects beyond the free end of the transducer. The transducer 22 is positioned so that its free end is positioned adjacent the ledge 14 of the housing 12. The terminal wires 25 of the windings of the transducer 22 extend from the housing 12 through the mounting hole 18 in the mounting block 16.

A flat diaphragm 26 of a resilient metal, such as berillium copper, is seated on the ledge 14 of the housing 12 and extends across the housing. The diaphragm 26 has an annular groove 28 in its side which faces the transducer 22. The groove 28 provides the diaphragm 26 with a thin active section which increases the resiliency and minimizes the hysteresis in the diaphragm. A deflection core 30, which is a disk of metal, such as carbon steel, is secured to the center of the surface of the diaphragm 26 which faces the transducer 22.

A closure member 32 having a cylindrical outer wall 34 and a flat end wall 36 is secured in the counterbored end of the housing 12. The outer wall 34 fits in the counterbore in the housing 12 and engages the diaphragm 26 to clamp the diaphragm against the ledge 14 of the housing 12. The end wall 36 extends across the end of the housing 12 and has an inlet portion 38 therethrough.

In the use of the pressure transducer 10, an input signal is applied to the primary winding of the proximity transducer 22 so as to provide an output signal from the proximity transducer. A medium, such as a gas or liquid, whose pressure is to be measured, is admitted into the housing 12 through the inlet port 38 in the closure member 32. Thus, the pressure to be measured is applied to the diaphragm 26. If the pressure to be measured is greater than the pressure on the other side of the diaphragm, the center of the diaphragm is deflected toward the proximity transducer 22. This moves the deflection core 30 toward the end of the core 24 of the proximity transducer 22 and thereby changes the output signal from the proximity transducer. Any changes in the pressure being measured will cause a change in the deflection of the diaphragm 26 so as to move the deflection core 30 either toward or away from the end of the core 24 of the proximity transducer 22 and thereby change the output signal of the transducer. By precalibrating the output signal of the transducer with respect to the pressure applied to the diaphragm, the output signal from the transducer will indicate the pressure being measured.

The construction of the diaphragm 26 provides the diaphragm with little, if any, hysteresis. Thus, the deflection of the diaphragm will accurately reflect the changes in the pressure applied to the diaphragm. Since the transducer 10 includes no other moving parts, the output signal from the proximity transducer 22 will accurately indicate the pressure being measured. With the vent hole 20 being open, the transducer 10 will measure gage pressure. To measure absolute pressure, it is only necessary to close the vent hole 20 with a plug. The thickness of the diaphragm 26 determines the range of the pressures which can be measured with the transducer 10. To change the pressure range it is only necessary to remove the closure member 32 and replace the diaphragm 26 with one of a different thickness. Since the transducer 10 is made up of only a few parts, it can be easily assembled and can be made small in size.

Figure 2:
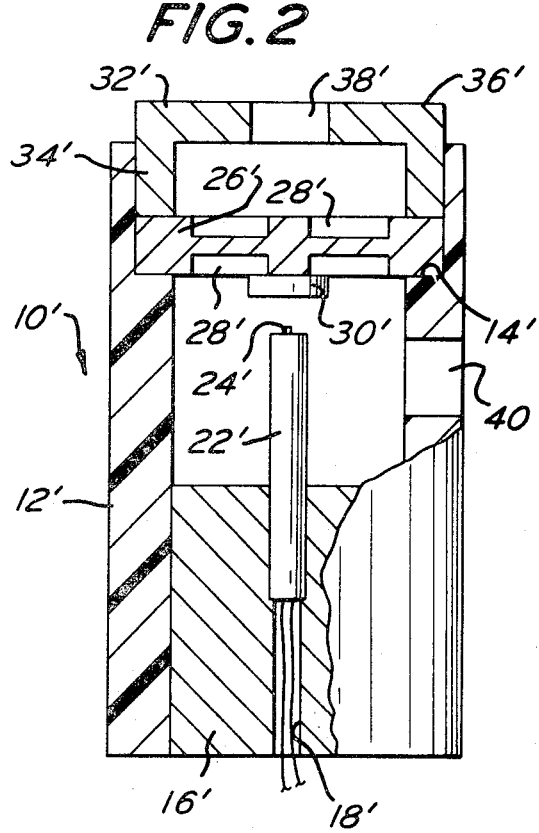
FIG. 2 is a longitudinal sectional view of a differential pressure transducer of the present invention.

Referring to FIG. 2, there is shown a pressure transducer of the present invention, generally designated as 10', for measuring pressure differentials. Transducer 10' is of a construction similar to that of transducer 10 of FIG. 1. However, the housing 12' of the transducer 10' has an inlet port 40 therethrough between the diaphragm 26' and the mounting block 16', and the mounting block 16' has only a central mounting hole 18' in which the proximity transducer 22' is mounted. Also, the diaphragm 26' has annular grooves 28' in each of its surfaces. The outer wall 34' of the closure member 32' engages the diaphragm 26' and clamps it against the ledge 14' of the housing 12'. The end wall 36' of the closure member 32' has an inlet port 38' therethrough. A deflection core 30' is secured to the surface of the diaphragm 26' which faces the proximity transducer 22'.

The transducer 10' is used to measure the pressure differential between two mediums. The mediums may be two distinct mediums or may be the same medium at two different points in a system, such as on opposite sides of a venturi or the like. However, to describe the operation of the transducer 10', the mediums will be referred to as two mediums. One of the mediums is admitted into the housing 12' through the inlet port 38' in the closure member 32', and the other medium is admitted into the housing 12' through the inlet port 40 in the housing 12'. Thus, the mediums are applied to opposite sides of the diaphragm 26'. If the pressure of the medium admitted through the inlet port 38' is greater than the pressure of the other medium, the center of the diaphragm will be deflected toward the proximity transducer 22'. This moves the deflection core 30' closer to the end of the core 24' of the proximity transducer 22' so as to change the output signal of the proximity transducer. If the pressure of the medium admitted through the inlet port 40 is greater than the pressure of the other medium, the center of the diaphragm 26' will be deflected away from the proximity transducer 22'. This moves the deflection core 30' away from the end of the transducer core 24' so as to change the output signal of the transducer. Thus, the output signal of the transducer will indicate the pressure differential between the two mediums.

Figure 3:
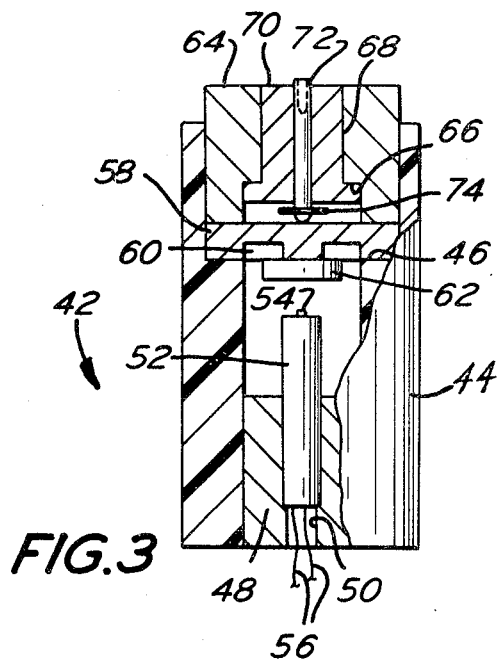
FIG. 3 is a longitudinally sectional view of a force transducer of the present invention.

Referring to FIG. 3, a force transducer of the present invention is generally designated as 42. Force transducer 42 comprises a cylindrical, tubular housing 44, one end of which is counterbored to provide a radially extending ledge 46. A mounting block 48 has a mounting hole 50 extending longitudinally through the center thereof. A proximity transducer 52 is secured in the mounting hole 50 and projects into the housing. The core 54 of the transducer 52 projects from the free end of the proximity transducer, and the terminal wires 56 of the proximity transducer extend from the housing 44 through the mounting hole 50.

A diaphragm 58 is seated on the ledge 46 of the housing 44 and extends across the housing. The diaphragm has an annular groove 60 in its surface which faces the proximity transducer 58. A deflection core 62 is secured to the center of the surface of the diaphragm 58 which faces the proximity transducer 52. A closure member 64 is secured in the counterbored end of the housing 44. The closure member 64 has a recess 66 in its inner end, and a hole 68 extending longitudinally through the center thereof to the recess 66. The inner end of the closure member 64 engages the diaphragm 58 to clamp the diaphragm against the ledge 46 of the housing 42. A bearing bushing 70 is secured in the hole 68 in the closure member 64. A force transmitting rod 72 slidably extends through the bearing bushing 70. The inner end of the rod 72 has a head 74 thereon which engages the diaphragm 58. The other end of the rod 72 is adapted to be connected to a device which produces the force to be measured.

In the use of the force transducer 42, a force applied to the rod 72 moves the rod against the diaphragm 58 and deflects the diaphragm toward the proximity transducer 52. This moves the deflection core 62 closer to the transducer core 54 so as to change the output signal of the transducer. When the force applied to the rod 72 is reduced, the diaphragm 58 through its own resiliency will tend to return to its normal position. This moves the deflection core 62 away from the transducer core 54 and again changes the output signal of the transducer. Thus, the output signal from the transducer will indicate the magnitude of the force being applied to the rod 72.

Figure 4:
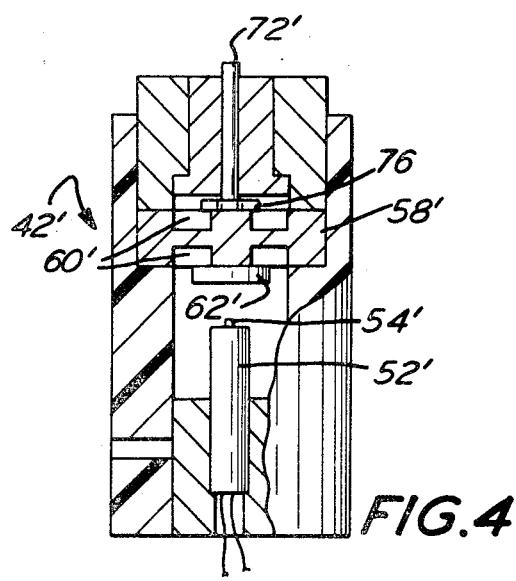
FIG. 4 is a longitudinal sectional view of a differential force transducer of the present invention.

Referring to FIG. 4, a differential force transducer of the present invention is generally designated as 42'. Transducer 42' is similar in construction to the force transducer 42 of FIG. 3. However, the force transmitting rod 72' is secured, such as by threading, to a washer 76 which is secured to the surface of the diaphragm 58'. Also, the diaphragm 58' has an annular groove 60' in each of its surfaces.

In the use of the transducer 42', the force transmitting rod 72' is connected to a mechanism or mechanisms which apply forces in opposite directions to the rod. If one of the forces is greater than the other, the rod 72' will be moved longitudinally. This will deflect the center of the diaphragm 58' either toward or away from the proximity transducer 52' so as to move the deflection core 62' either toward or away from the core 54' of the proximity transducer 52'. This will change the output signal of the transducer. Thus, the output signal of the transducer will indicate the difference between the two forces applied to the force transmitting rod 72'.

The present invention may be embodied in other specific forms without departing from the spirit or essential attributes thereof and, accordingly, reference should be made to the appended claims, rather than to the foregoing specification as indicating the scope of the invention.

What is claimed is:

1. A transducer means comprising a housing, a resilient diaphragm extending across and secured to said housing adjacent one end of the housing which end is of a nonmagnetic metal, a deflection core of metal mounted on the surface of the diaphragm for movement with said diaphragm, a proximity transducer having a primary winding for receiving electrical energization, a secondary winding for delivering an output signal and a fixed core receiving said winding about it for electrically coupling said primary and secondary windings and having an end extending from one end of said transducer, said transducer being mounted in said housing to provide a high-reluctance flux path between its core ends and having said one end adjacent to the deflection core, and means for applying force to be measured to said diaphragm so as to deflect the diaphragm and move the deflection core with respect to said one end of the core of the proximity transducer, whereby the coupling between the primary and secondary windings is varied and the secondary winding provides a corresponding output signal.

2. A transducer means in accordance with claim 1 including a mounting block secured within the other end of the housing, said mounting block having a hole extending longitudinally through the center thereof, and the proximity transducer is mounted in said hole.

3. A transducer means in accordance with claim 1 in which the diaphragm has an annular groove in its surface.

4. A transducer means in accordance with claim 3 in which the surface of said diaphragm having said annular groove faces the proximity transducer and includes a cover member secured within and extending across the one end of the housing, said cover member having an opening therethrough through which the force to be measured is applied to the diaphragm.

5. A transducer means in accordance with claim 4 in which the inner surface of the housing has a radially extending ledge adjacent to but spaced from the one end of the housing, the diaphragm is seated on said ledge, and the cover member engages said diaphragm to clamp the diaphragm against said ledge.

6. A transducer means in accordance with claim 4 in which the opening in said cover member is an inlet port through which a medium whose pressure is to be measured is admitted into said housing to be applied to said diaphragm, and the mounting block has a vent hole extending therethrough and opening into the housing.

7. A transducer means in accordance with claim 4 in which the opening in said cover member is an inlet port through which a medium whose pressure is to be measured is admitted into said housing to be applied to a surface of the diaphragm, and the housing has an inlet port therethrough between the diaphragm and the mounting block through which a medium whose pressure is to be measured is admitted into said housing to be applied to the other surface of the diaphragm so that the transducer means measures the difference between the pressures of the mediums.

8. A transducer means in accordance with claim 7 in which the diaphragm has an annular groove in its surface which faces the cover member.

9. A transducer means in accordance with claim 4 including a force transmitting rod extending through and slidably supported in the opening in the cover member, said rod engaging said diaphragm so as to deflect the diaphragm when a force to be measured is applied to the rod.

10. A transducer means in accordance with claim 9 in which the rod is secured at one end to the diaphragm.

11. A transducer means in accordance with claim 10 in which the diaphragm has an annular groove in its surface which faces the cover member.

* * * * *